United States Patent [19]

Wakuda

[11] Patent Number: 5,739,661
[45] Date of Patent: Apr. 14, 1998

[54] STEPPING MOTOR DRIVER

[75] Inventor: Hiroshi Wakuda, Fukushima-ken, Japan

[73] Assignee: Alps Electric Co., Ltd., Tokyo, Japan

[21] Appl. No.: 611,158

[22] Filed: Mar. 5, 1996

[30] Foreign Application Priority Data

Mar. 15, 1995 [JP] Japan .................... 7-055919

[51] Int. Cl.[6] ..................... H02P 8/22
[52] U.S. Cl. ..................... 318/685
[58] Field of Search ................ 318/685, 696, 318/254, 700, 701, 720, 724

[56] References Cited

U.S. PATENT DOCUMENTS

| | | | |
|---|---|---|---|
| 4,370,065 | 1/1983 | Kawamura et al. | 318/696 X |
| 4,383,209 | 5/1983 | Lewis | 318/696 |
| 4,431,955 | 2/1984 | Faedi et al. | 318/696 |
| 4,683,409 | 7/1987 | Boillat | 318/696 |
| 4,868,478 | 9/1989 | Hedlund et al. | 318/696 |

FOREIGN PATENT DOCUMENTS 63-96782  4/1988  Japan.

*Primary Examiner*—Bentsu Ro
*Attorney, Agent, or Firm*—Guy W. Shoup

[57] ABSTRACT

A stepping motor driver drives, for example, a stepping motor incorporated into an optical recording/reproducing apparatus to move an optical pickup in the radial direction of an optical disk during a seek operation. A current measuring device measures a current flowing through the stepping motor, and a control circuit changes the excitation phase of the stepping motor on the basis of the variation of the current detected by the current measuring device.

10 Claims, 4 Drawing Sheets

FIG. 3

| PHASE EXCITATION | 1-2-PHASE EXCITATION | 2-PHASE EXCITATION | 1-PHASE EXCITATION |
|---|---|---|---|
| +A-B | * | * |   |
| +A | * |   | * |
| +A+B | * | * |   |
| +B | * |   | * |
| -A+B | * | * |   |
| -A | * |   | * |
| -A-B | * | * |   |
| -A | * |   | * |

← ONE ELECTRICAL TURN →

\* : EXCITED PHASE (ONE TURN CORRESPONDS TO FIVE ELECTRICAL TURNS. STM OF 18° STEPS IS EMPLOYED.)

STEPPING MOTOR DRIVER

BACKGROUND OF THE INVENTION

1. Field of the Invention

The present invention relates to a stepping motor driver and, more particularly, to a stepping motor driver suitable for driving a stepping motor incorporated into an optical recording/reproducing apparatus to move an optical pickup in the radial direction of an optical disk at a high rotating speed for seek operation.

2. Description of the Related Art

When driving the rotor of a stepping motor having excitation phases A, $\overline{A}$, B and $\overline{B}$ for rotation by a two-phase excitation system, the excitation phases are changed as shown in FIGS. 2A and 2B. When driving such a stepping motor for rotation at a high rotating speed by changing the excitation phases as shown in FIGS. 2A and 2B, a driving signal of a frequency far lower than a frequency that causes the stepping motor to become out of step is used so that the stepping motor may not become out of step.

Such a conventional stepping motor driving method, however, is unable to drive the stepping motor at a high rotating speed because the excitation phases are changed at a frequency far lower than a frequency that cause the stepping motor to become out of step regardless of the angular position of the rotor. For example, the conventional stepping motor driving method is unable to drive a stepping motor to move an optical pickup of an optical recording/reproducing apparatus in the radial direction of an optical disk loaded into the optical recording/reproducing apparatus at a high speed during a seek operation.

SUMMARY OF THE INVENTION

It is a first object of the present invention to provide a stepping motor driver capable of driving a stepping motor at a high rotating speed without causing the stepping motor to become out of step.

A second object of the present invention is to provide a stepping motor driver capable of driving a stepping motor at a high rotating speed without causing the stepping motor to become out of step and to generate vibrations.

A third object of the present invention is to provide a stepping motor driver capable of driving a stepping motor at a high rotating speed without causing the stepping motor to become out of step and of making the stepping motor generate a large torque by altering the excitation phase of the stepping motor when a current supplied to the stepping motor reaches a peak.

A fourth object of the present invention is to provide a stepping motor driver capable of making a stepping motor drive an optical pickup at a high seek speed without causing the stepping motor to become out of step.

According to a first aspect of the present invention, the excitation phase of a stepping motor is altered on the basis of the variation of a current supplied to the stepping motor, that varies according to back voltage that varies according to the angular position of the rotor. Accordingly, the stepping motor is able to operate at a high rotating speed without become out of step.

According to a second aspect of the present invention, the excitation phase of a stepping motor is altered when a current supplied to the stepping motor increases to or beyond a predetermined level. Accordingly, the stepping motor is able to operate at a high rotating speed without becoming out of step and generating vibrations.

According to a third aspect of the present invention, the excitation phase of a stepping motor is altered when a current supplied to the stepping motor reaches a peak. Accordingly, the stepping motor is able to operate at a high rotating speed without becoming out of step and to generate a large torque.

According to a fourth aspect of the present invention, an optical pickup can be moved radially relative to an optical disk at a high seek speed during a seek operation by a stepping motor driver such that the stepping motor driver does not become out of step.

BRIEF DESCRIPTION OF THE DRAWINGS

The above and other objects, features and advantages of the present invention will become more apparent from the following description taken in connection with the accompanying drawings, in which:

FIG. 3 is a diagram for assistance in explaining operations for changing the excitation phases of the stepping motor of FIGS. 2A and 2B;

DESCRIPTION OF THE PREFERRED EMBODIMENT

Hereinafter a preferred embodiment of the present invention will be described with reference to the accompanying drawings.

Figure 1:
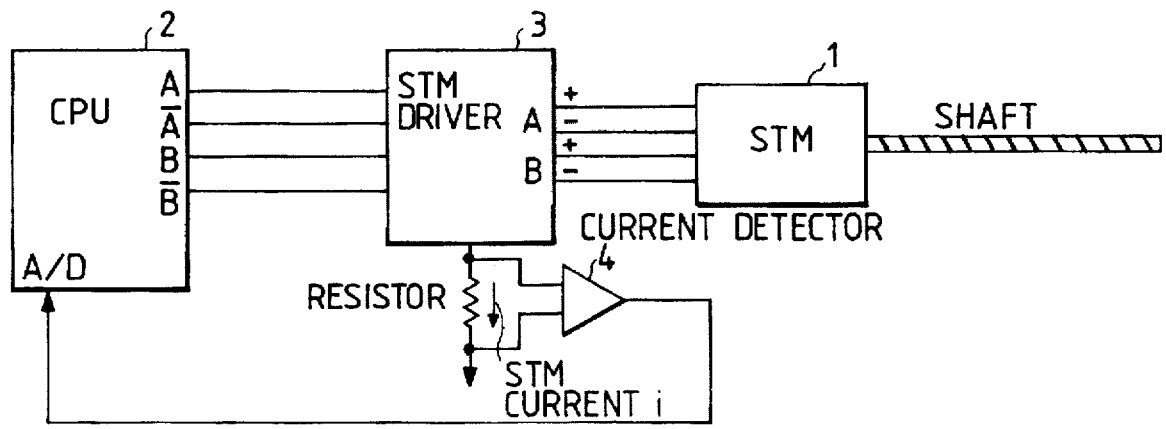
FIG. 1 is a block diagram of a stepping motor driver in a preferred embodiment according to the present invention.
Figure 2A:
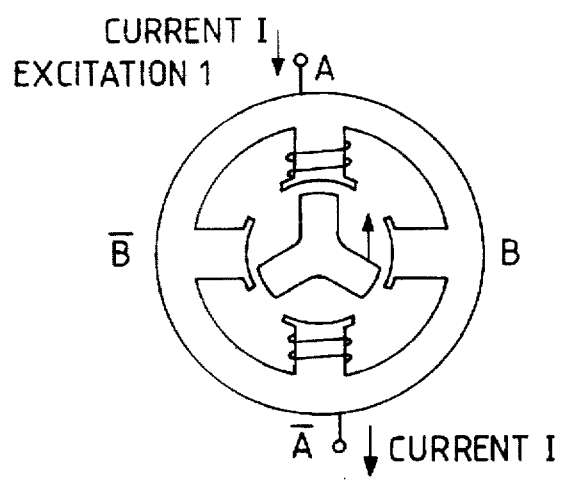
FIGS. 2A and 2B are schematic end views of a stepping motor.
Figure 2B:
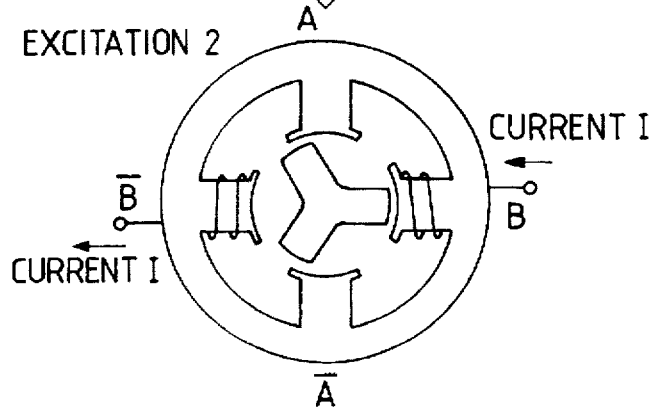

Referring to FIG. 1, a stepping motor driver 3 in a preferred embodiment according to the present invention drives a two-phase stepping motor (STM) 1 having a pair of ±A phases and a pair of ±B phases. Possible driving systems are a unipolar driving system and a bipolar driving system. Possible excitation current control systems are a constant-voltage control system, a two-voltage control system and a constant-current control system. Possible excitation systems are a 1-2-phase excitation system, a 2-phase excitation system and a 1-phase excitation system. One full turn of the rotor of the stepping motor 1 corresponds to five electrical turns.

When the basic step angle of the stepping motor 1 is 18° and the stepping motor 1 is excited by the 1-2-phase excitation system, the ±A phases and the ±B phases of the stepping motor 1 are excited in eight excitation patterns of direction of magnetization (direction of flow of current I), i.e., excitation pattern 1: +A−B, excitation pattern 2: +A, excitation pattern 3: +A+B, excitation pattern 4: +B, excitation pattern 5: −A+B, excitation pattern 6: −A, excitation pattern 7: −A−B and excitation pattern 8: −B, as shown in FIG. 3 when the rotor of the stepping motor 1 turns one full turn. Patterns 1 to 8 are changed in that order to turn the rotor one full turn. When the 2-phase excitation system is employed, the rotor is turned one full turn by excitation patterns 1, 3, 5 and 7. When the 1-phase excitation system is employed, the rotor is turned one full turn by excitation patterns 2, 4, 6 and 8.

Referring to FIG. 1, when driving the stepping motor 1, a CPU 2 gives a 4-bit control signal to the stepping motor driver 3 to select the eight excitation patterns 1 to 8 or four excitation patterns. Then, the stepping motor driver 3 supplies eight kinds or four kinds of currents I to the stepping motor 1 according to the 4-bit control signal to drive the stepping motor 1. In this embodiment, a current detector 4 converts a current i flowing through the energized coils of the stepping motor 1 (hereinafter referred to as "STM current") into a corresponding voltage signal and gives the same to the CPU 2.

According to Fleming's right-hand rule, back voltage generated in the stator coils of the stepping motor 1 is expressed by:

(Back voltage)=(Magnetic flux density)×(Thickness of the conductor)×(Moving speed)

Therefore, the back voltage varies according to the rotating speed of the rotor of the stepping motor 1, and the levels of the phases vary according to the rotating speed of the rotor of the stepping motor 1.

Figure 4:
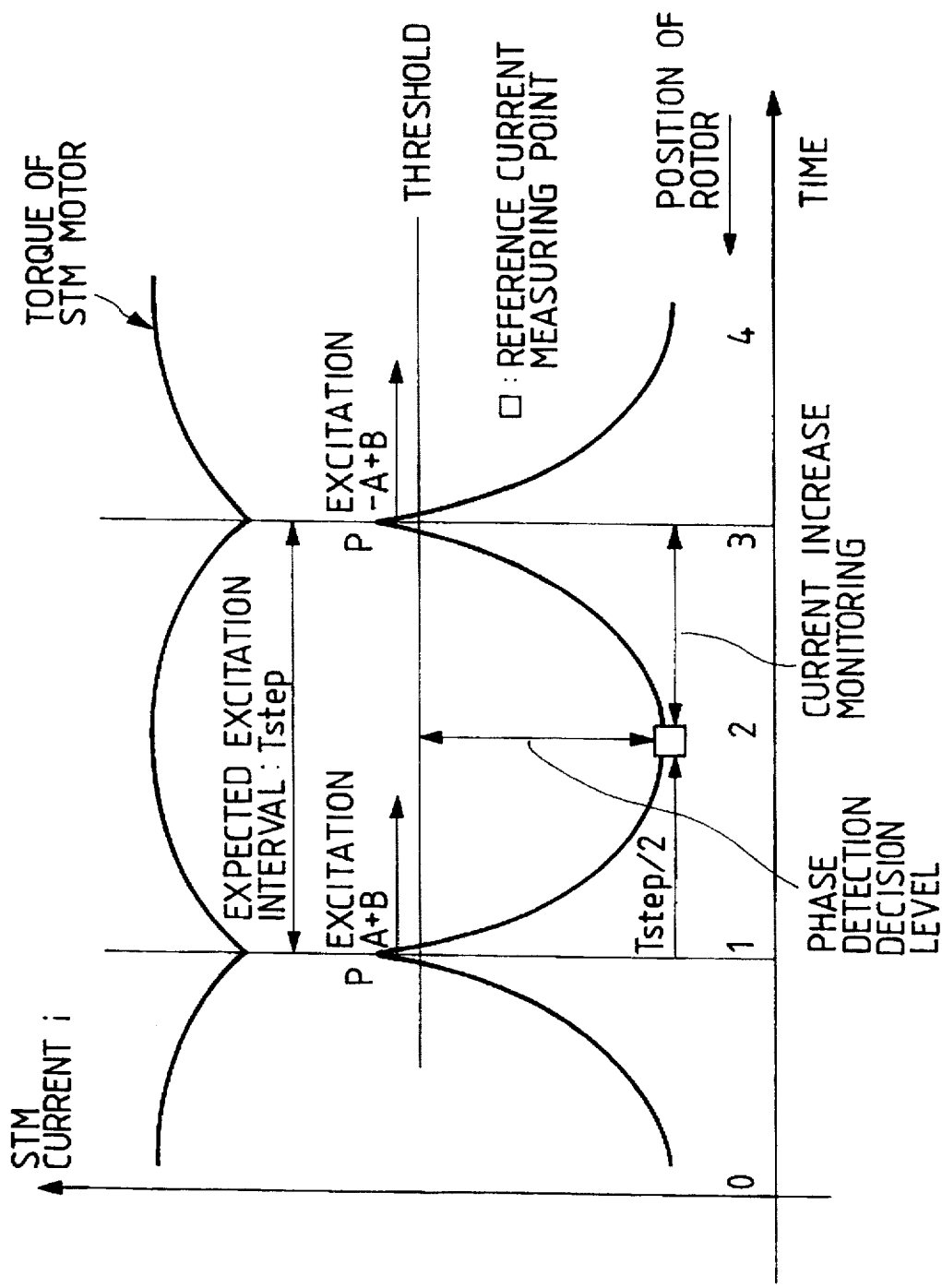
FIG. 4 is a graph showing the relation between a current supplied to the stepping motor of FIGS. 2A and 2B and torque generated by the same stepping motor.

Suppose that the stepping motor 1 is driven by the constant-voltage driving system and excited by the 2-phase excitation system, and the phase excitation pattern is altered from excitation pattern 3 (+A+B) to excitation pattern 5 (−A+B). As shown in FIG. 4, excitation in excitation pattern 3 (+A+B) is started when the rotor is at rotor position 1, and excitation in excitation pattern 5 (−A+B) is started when the rotor arrives at rotor position 3 after passing rotor position 2. When the rotor is at rotor position 1 or 3, the back voltage reaches a minimum and the STM current i reaches a maximum. When the rotor is at rotor position 0, 2 or 4, the back voltage reaches a maximum and the STM current i reaches a minimum. When the stepping motor 1 is thus driven by the constant-voltage driving system and the 2-phase excitation system, the time interval between the maximum and the minimum values of the STM current i is half an expected excitation interval Tstep. Therefore, the present angular position of the rotor can be monitored through the detection of the STM current i.

The torque generated by the stepping motor 1 thus driven by this excitation system drops sharply to a minimum when the rotor reaches rotor position 1 or 3, and reaches a maximum when the rotor reaches rotor position 0, 2 or 4. Therefore, when the stepping motor 1 is thus driven by the constant-voltage driving system and the 2-phase excitation system, the time interval between the maximum and the minimum values of the torque is half the expected excitation interval Tstep. The maximum and the minimum torques correspond to the minimum and the maximum values of the STM current i, respectively.

Generally, when driving a load by the stepping motor 1, the excitation phase alteration time is shifted according to the purpose to which the stepping motor is applied. For example, the excitation phases are changed at a rotor position slightly before the peak of the STM current i when importance is attached to preventing vibrations, and the excitation phases are changed at a rotor position slightly after the peak of the STM current i when importance is attached to generating a large torque. Needless to say, the conventional phase changing method changes the excitation phases at a frequency far lower than a frequency that will cause the stepping motor to become out of step (i.e., wherein the rotational position of the rotor becomes out of synchronization with the excitation phase pattern generated by the stepping motor driver).

Figure 5:
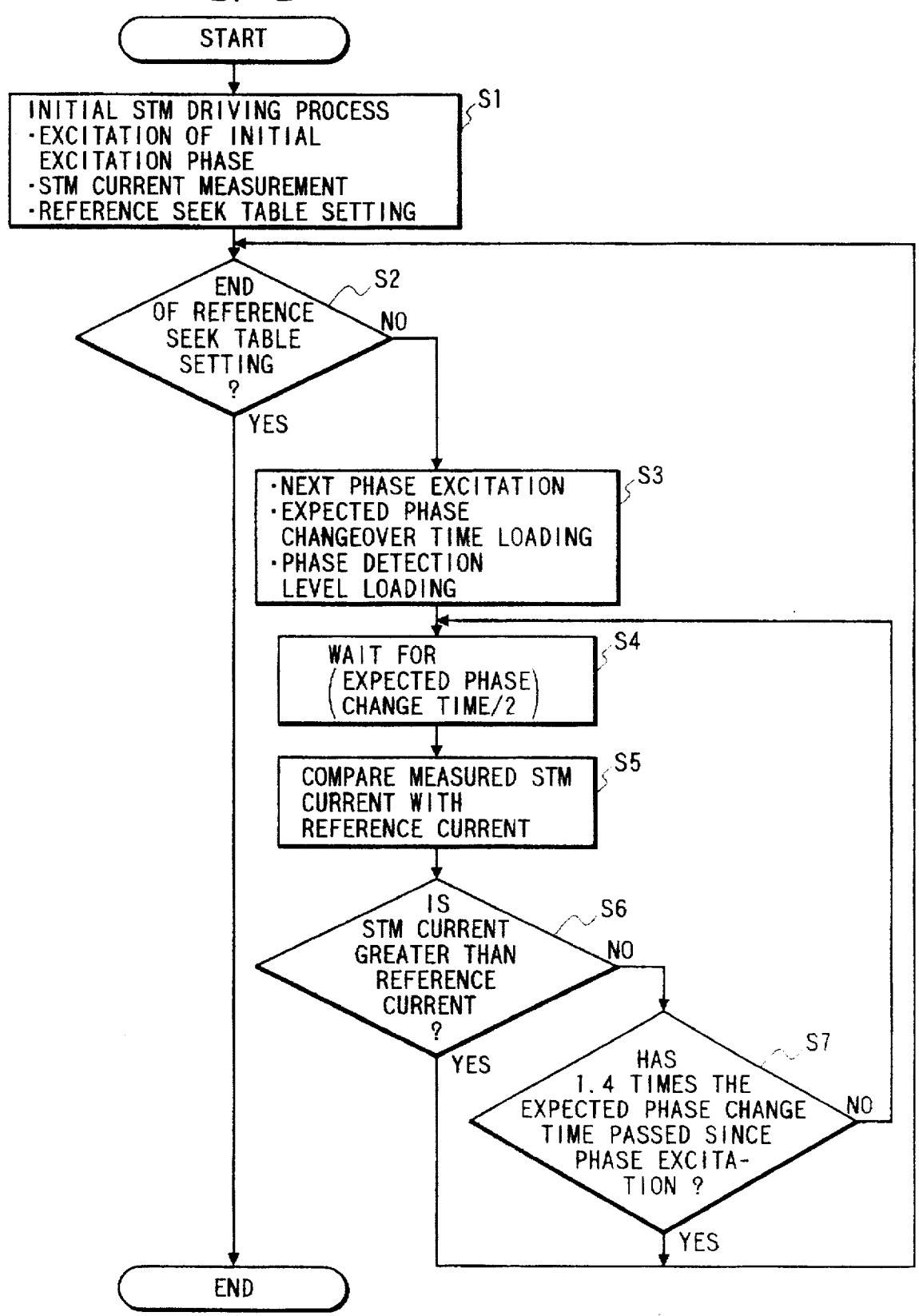
FIG. 5 is a flow chart for assistance in explaining operations of the stepping motor driver of FIG. 1 for driving an optical pickup of an optical recording/reproducing apparatus for performing a seek operation.

FIG. 5 is a flow chart of an excitation phase changeover timing process of changing the excitation phases during a driving an optical pickup of an optical recording/reproducing apparatus for seek operation, attaching importance to preventing vibrations. Prior to driving the stepping motor 1, an initial excitation phase is excited, the STM current i is measured and a reference seek table is set in step S1. Then, when it is decided in step S2 that the reference seek table is not ended, the next excitation phase is excited, an expected phase changeover time Tstep is set and a phase detection level corresponding to the difference between a reference current equal to the minimum value of the STM current i, and a threshold corresponding to a current variation due to a torque ripple is loaded in step S3. Subsequently, after waiting for a time equal to half the expected phase changeover time Tstep in step S4, the STM current i is measured in step S5, and the measured values of the STM current i measured at times corresponding to rotor positions 0, 2 and 4 are compared with a reference current in step S5. If the measured value of the STM current i is higher than the reference current, the process returns to step S2 to execute steps to change the excitation pattern to the next excitation pattern. If the measured value of the STM current i is equal to or lower than the reference current and a time equal to 1.4 times the expected phase changeover time Tstep has not elapsed after the excitation of the phases, the process returns to step S5 to repeat step S5 and the following steps. If the time equal to 1.4 times the expected phase changeover time Tstep has elapsed, the process returns to step S2.

In the example shown in FIG. 4, the excitation phase change timing process changes the excitation phases when the STM current i exceeds the minimum value by the 2-phase excitation system. Accordingly, the stepping motor 1 is able to operate at a high rotating speed without becoming out of step and vibrations are prevented. When importance is attached to generating a large torque, the excitation phases are changed at the time when the STM current i reaches the peak after exceeding the threshold or at the time slightly after the time corresponding to the peak of the STM current i. Accordingly, the stepping motor 1 is able to operate at a high rotating speed without becoming out of step and to generate a large torque.

The stepping motor driver of the present invention is not limited in its application only to driving a stepping motor by the constant-voltage system and the 2-phase excitation system, but also to driving a stepping motor by other excitation systems, and is applicable to a stepping motor differing in the number of phases from the stepping motor specifically described herein.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A stepping motor driver for transmitting an excitation current to a stepper motor, the excitation current including a plurality of excitation patterns corresponding to excitation phases of the stepping motor, the stepping motor driver comprising:

a current measuring means for measuring the excitation current flowing through the stepping motor during a first excitation phase; and a control means for changing the excitation current transmitted to the stepping motor from a first excitation pattern corresponding to the first excitation phase to a second excitation pattern corresponding to a second excitation phase when the excitation current measured by the current measuring means exceeds a predetermined value.

2. The stepping motor driver according to claim 1, wherein the current measuring means measures the excitation current flowing through the stepping motor after one-half of an expected changing-over interval between the first and second excitation phases has elapsed during the first excitation phase.

3. The stepping motor driver according to claim 2, wherein when the excitation current measured by the current measuring means is smaller than the predetermined value after said one-half of the expected changing-over interval has elapsed, the excitation current transmitted to the stepping motor is measured for a further specified time period; and wherein the control means transmits the second excitation pattern to the stepper motor when the excitation current measured by the current measuring means exceeds the predetermined value during said specified time period.

4. The stepping motor driver according to claim 3, wherein said further specified time period is 1.4 times the expected changing-over interval between the first and second excitation phases.

5. A stepping motor driver for transmitting an excitation current to a stepper motor, the excitation current including a plurality of excitation patterns corresponding to excitation phases of the stepping motor, the stepping motor driver comprising:

a current measuring means for measuring the excitation current flowing through the stepping motor during a first excitation phase; and a control means for changing the excitation current transmitted to the stepping motor from a first excitation pattern corresponding to the first excitation phase to a second excitation pattern corresponding to a second excitation phase, wherein said control means changes the excitation current transmitted to the stepping motor when the excitation current measured by the current measuring means is greater than or equal to a peak of the excitation current flowing through the stepping motor.

6. A method for driving a stepper motor comprising the steps of:

transmitting an excitation current to the stepper motor, the excitation current including a first excitation pattern corresponding to a first excitation phase of the stepping motor;

measuring the excitation current flowing through the stepping motor during the first excitation phase; and changing the excitation current transmitted to the stepping motor from the first excitation pattern to a second excitation pattern corresponding to a second excitation phase of the stepper motor when the excitation current measured by the current measuring means exceeds a predetermined value.

7. The method of claim 6, wherein the step of changing further comprises changing the excitation current transmitted to the stepping motor to the second excitation pattern when the excitation current measured by the current measuring means is greater than or equal to a peak of the excitation current flowing through the stepping motor.

8. The method of claim 6, wherein the step of measuring further comprises measuring the excitation current of the stepping motor after one-half of an expected changing-over interval between the first and second excitation phases has elapsed during the first excitation phase.

9. The method of claim 8, wherein the step of measuring further comprises, when the excitation current measured by the current measuring means is smaller than the predetermined value after said one-half of the expected changing-over interval has elapsed, measuring the excitation current transmitted to the stepping motor for a further specified time period; and wherein the step of changing further comprises transmitting the second excitation pattern to the stepper motor during said specified time period when the excitation current measured by the current measuring means exceeds the predetermined value.

10. The method of claim 9, wherein said specified time period is 1.4 times the expected changing-over interval between the first and second excitation phases.

* * * * *